United States Patent [19]
Neubrand et al.

[11] 3,916,738
[45] Nov. 4, 1975

[54] APPARATUS FOR MACHINING AND/OR TREATMENT OF TROCHOIDAL SURFACES

[75] Inventors: Paul Neubrand, Ludwigsburg; Karl Glaser, Markgroningen-Unterriexingen; Martin Prater, Ludwigsburg; Siegfried Schmid, Stuttgart-Kemnat, all of Germany

[73] Assignee: Ludwigsburger Maschinenbau GmbH, Ludwigsburg, Germany

[22] Filed: Mar. 26, 1974

[21] Appl. No.: 454,795

[30] Foreign Application Priority Data
Mar. 30, 1973 Germany............................ 2315856
Jan. 22, 1974 Germany............................ 2402763

[52] U.S. Cl. .......................... 82/18; 82/1.3; 408/54; 51/34 R
[51] Int. Cl.². B23B 41/04; B24B 7/00; B23B 39/00
[58] Field of Search ................... 82/1.3, 18; 408/54; 51/34 R

[56] References Cited
UNITED STATES PATENTS

| | | | |
|---|---|---|---|
| 2,870,578 | 1/1959 | Baier................................ | 408/54 X |
| 3,300,904 | 1/1967 | Gruner.............................. | 408/54 X |
| 3,812,574 | 5/1974 | Jones et al....................... | 408/54 X |
| 3,822,508 | 6/1974 | Bender............................. | 51/34 R |

FOREIGN PATENTS OR APPLICATIONS
1,161,105    1/1964    Germany ............................... 408/54

*Primary Examiner*—Harrison L. Hinson
*Attorney, Agent, or Firm*—Michael S. Striker

[57] ABSTRACT

Apparatus for moving at least one material removing or material applying tool along a trochoidal path, such as the internal surface of the peripheral wall of the outer body of a Wankel engine, has a control member which is driven to rotate about the system axis of the trochoidal path, a carrier which is rotatable on a first eccentric portion of the control member and supports one or more tool holders so that each tool holder can turn about an axis of the first eccentric portion, a fixed gear whose axis coincides with the system axis, a second gear which is rigid with the carrier and rolls along the first gear in response to rotation of the control member to thereby rotate the carrier about the axis of the first eccentric portion, and a device for changing the angular position of each tool holder during rotation of the carrier so that the orientation of the tools with respect to the adjacent portions of the trochoidal path remains unchanged. This device comprises a second eccentric portion on the control member and one or more connecting rods, each rotatable on the second eccentric portion and each movable in a diametrically extending guide channel of the respective tool holder.

32 Claims, 15 Drawing Figures

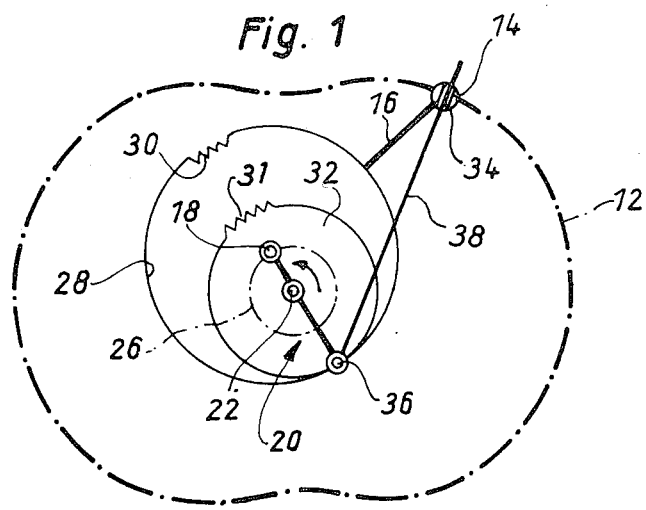
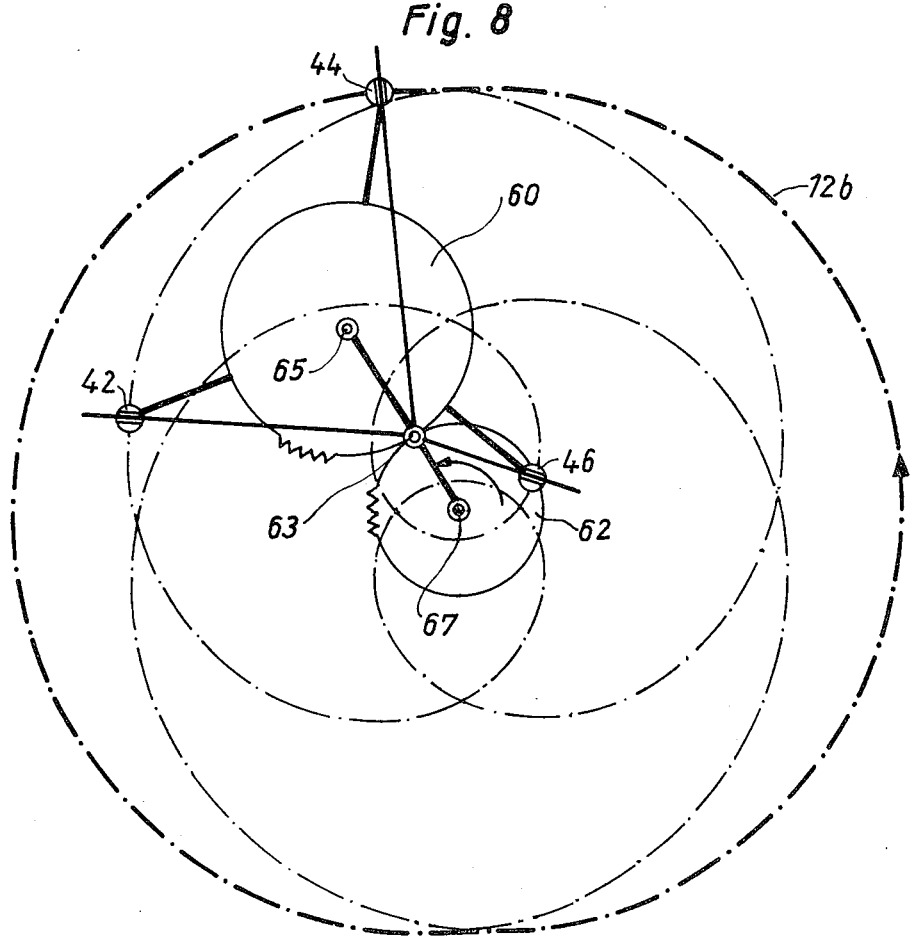

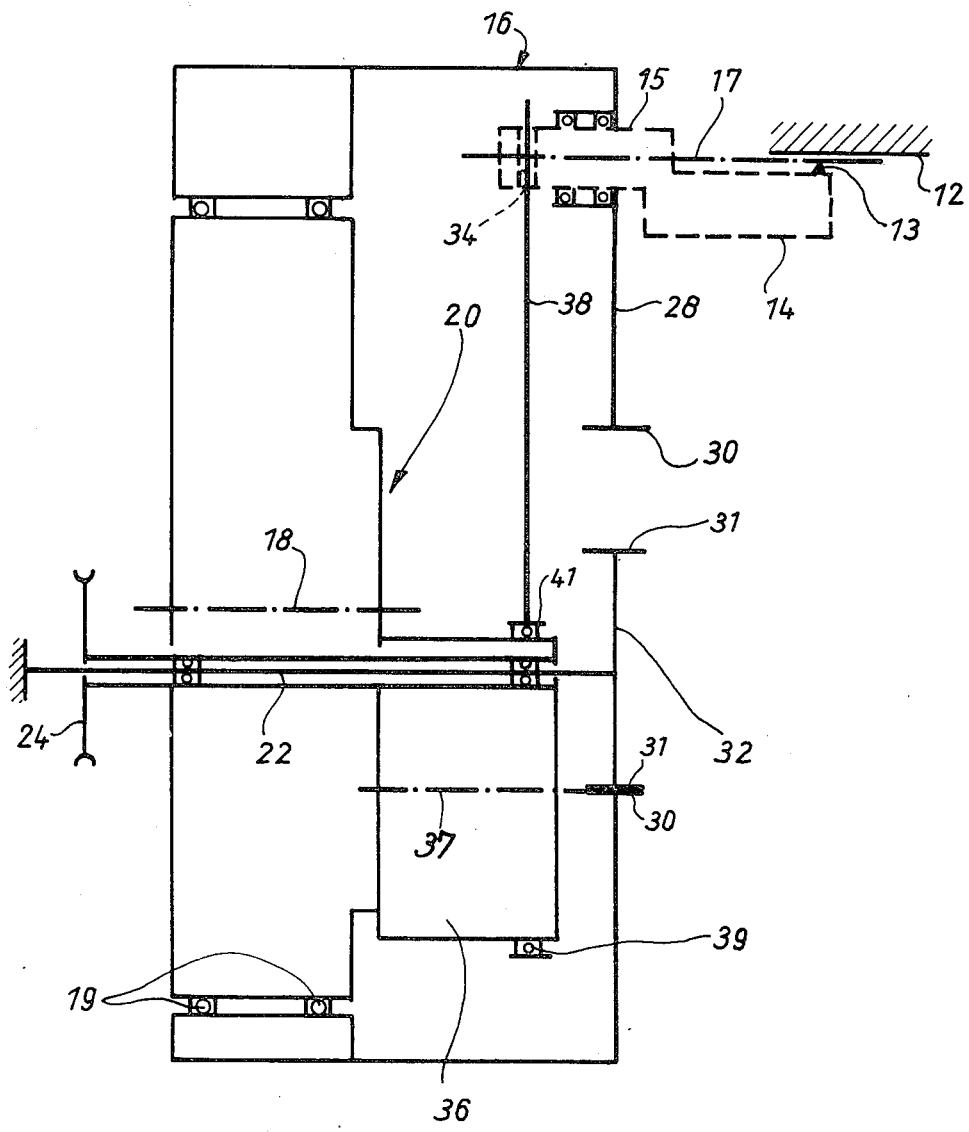

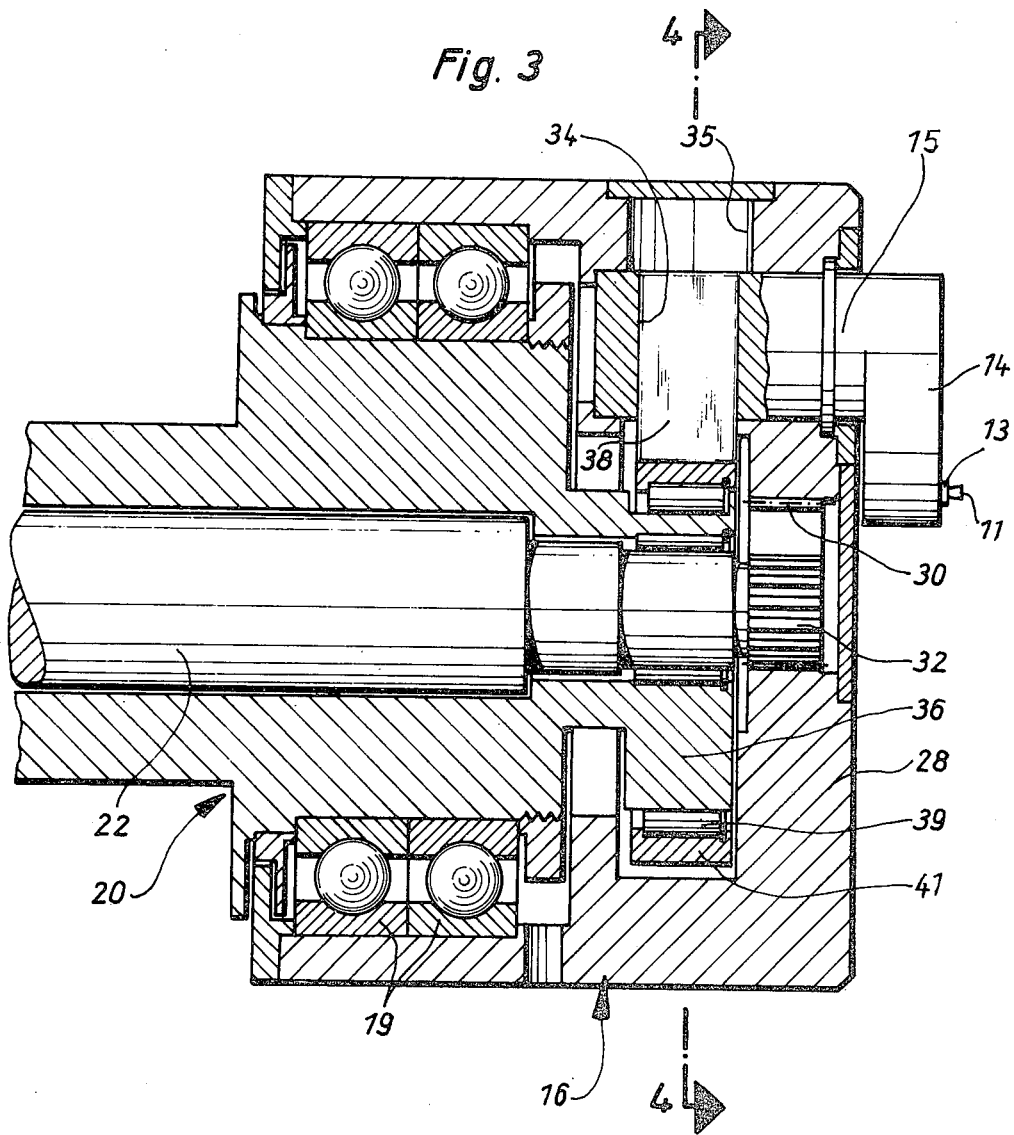

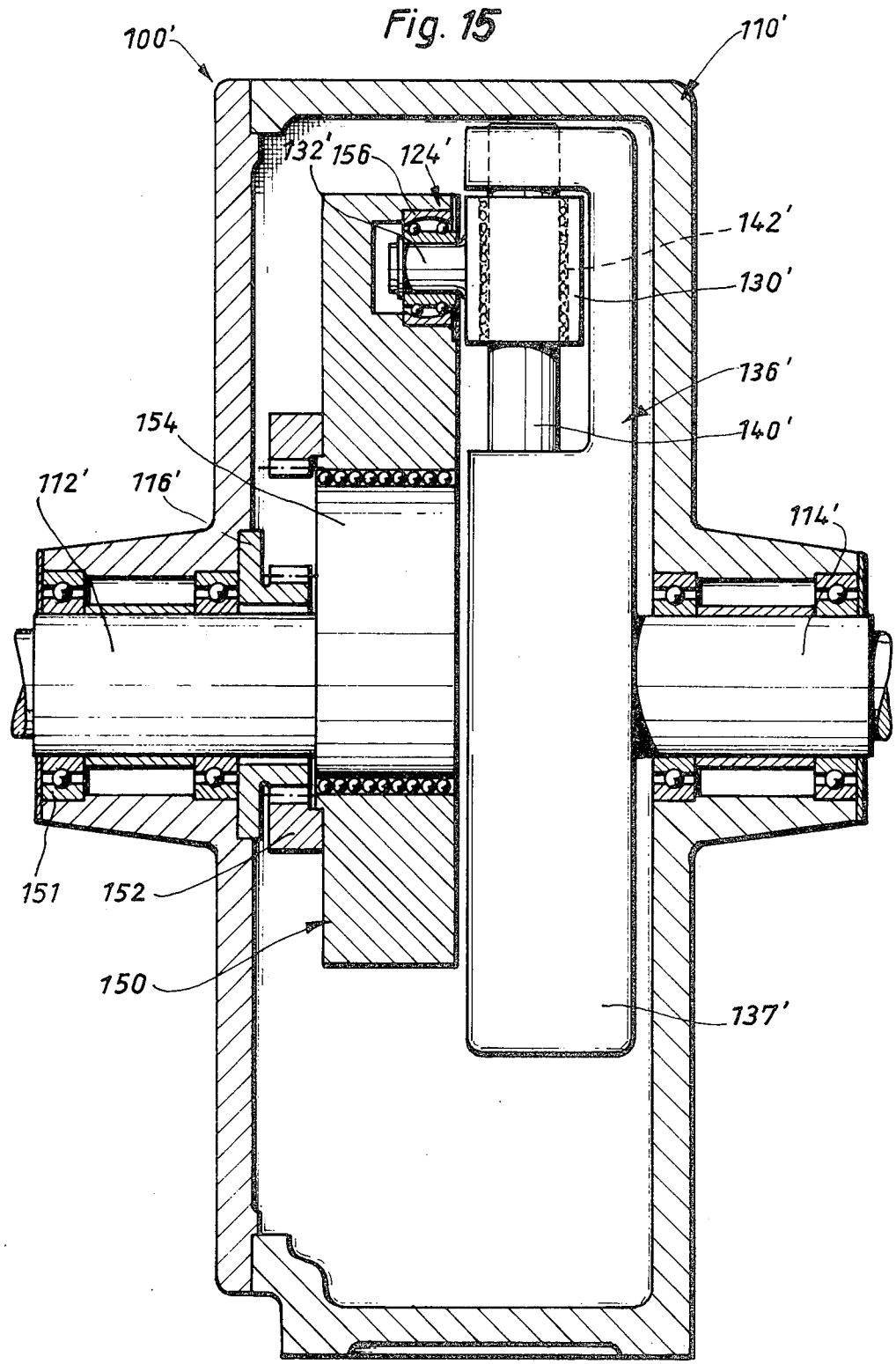

APPARATUS FOR MACHINING AND/OR TREATMENT OF TROCHOIDAL SURFACES

BACKGROUND OF THE INVENTION

The present invention relates to apparatus for moving one or more tools or the like along a trochoidal path.

With the development of rotary internal combustion engines (known as Wankel engines), the manufacturers of such engines encountered many problems in connection with the machining and/or other treatment of trochoidal surfaces. A typical trochoidal surface is the internal surface of the peripheral wall of the housing or outer body of a Wankel engine. Such surface surrounds a cavity having an axis (known as the system axis) along which the end walls of the outer body are spaced and which receives a rotary inner body or piston having three apices each of which is in contact with the internal surface of the peripheral wall in each angular position of the inner body. Reference may be had, for example, to U.S. Pat. No. 2,988,065 granted June 13, 1961 to Wankel et al.

Certain recently developed machine tools are designed for the express purpose of machining the trochoidal internal surfaces of peripheral walls of outer bodies of Wankel engines. In such machine tools, the movements of the tool (e.g., a turning tool which removes material from a blank which is to be converted into a finished peripheral wall) are guided by a pattern or template. It is further known to resort to machine tools which employ a grinding wheel (system Gleason). The grinding wheel is guided by a template or by a complex power train employing a large number of levers and/or links.

It is also known to treat or machine a trochoidal surface by resorting to three turning tools mounted in a common holder which is driven to rotate about a first axis while the first axis travels along a circular path whose center is located on the system axis. The holder for the turning tools resembles the piston or inner body of a Wankel engine and each of the turning tools is fixedly mounted at one of the three apices of the holder. Such rigid mounting of the tools in the rotary holder cannot insure accurate machining of a true trochoidal surface because the setting and rake angles of the cutting edges of tools vary continuously while the tools travel along a substantially trochoidal path. In other words, the angle between the cutting edge of each tool and a line which is normal to that point of the path where the respective tool removes material from the blank varies continuously as the holder for the turning tools rotates. The surfaces which are obtained by resorting to the just described machine tool must be subjected to a complex and expensive secondary treatment. Furthermore, the wear on the tools is high and the number of rejects is excessive.

SUMMARY OF THE INVENTION

An object of the invention is to provide a novel and improved apparatus which is capable of machining and/or otherwise treating trochoidal surfaces with a high degree of accuracy and reproducibility.

Another object of the invention is to provide an apparatus which is readily adjustable to machine and/or treat trochoidal surfaces of different size and/or shape.

A further object of the invention is to provide an apparatus for the machining and/or treatment of trochoidal surfaces with one or more material removing and/or other tools which are mounted, moved and oriented in a novel and improved way.

An additional object of the invention is to provide an apparatus which is particularly suited for the machining and/or treatment of internal surfaces of peripheral walls forming part of outer bodies of rotary internal combustion engines.

Still another object of the invention is to provide a novel and improved carrier for one or more tool holders in the above outlined apparatus and to provide a novel and improved means for moving the carrier and the tool holders with respect to the surface to be treated.

The apparatus of the present invention is utilized to move at least one material removing, material applying or other tool along a trochoidal path having a system axis. The apparatus comprises a control member, a carrier which is rotatable relative to the control member about a second axis parallel to the system axis, drive means for rotating the control member about the system axis and for thereby orbiting the second axis along a circular path having its center on the system axis, at least one tool holder which is mounted in or on the carrier for angular movement about a third axis parallel to the system axis, means for rotating the carrier relative to the control member about the second axis during rotation of the control member about the system axis, and means for changing the angular position of the holder relative to the carrier in response to rotation of the control member so that the orientation of a tool in the tool holder with respect to the adjacent portion of the trochoidal path remains unchanged while the tool tracks the trochoidal path. The means for changing the angular position of the holder relative to the carrier comprises an eccentric on the control member, a connecting rod or an analogous preferably rigid orienting member turnably mounted on the eccentric and being movable transversely of the third axis, and guide means (e.g., a diametrically extending channel in the tool holder) for preventing angular movements of the tool holder relative to the orienting member.

The means for rotating the carrier relative to the control member about the second axis may comprise a stationary first member (e.g., a spur gear or an internal gear) having a (preferably toothed) first circular surface whose center is located on the system axis, and a second member (e.g., an internal gear or a spur gear) which is rigid with the carrier and has a (preferably toothed) second circular surface whose center is located on the second axis. The second surface rolls along the first surface in response to rotation of the control member about the system axis.

If the orienting member is a connecting rod which moves lengthwise while the control member rotates, the carrier may be provided with a recess which registers with the guide channel of the tool holder to receive a portion of the connecting rod in at least one angular position of the eccentric with respect to the system axis.

The speed of movement of the tool holder along the trochoidal path varies when the control member is rotated at a constant speed. Therefore, and especially if the tool in the tool holder is used to apply a coat of metal or other material to the internal surface of the peripheral wall of the outer body of a rotary internal combustion engine, the drive means for the control member may comprise a transmission for rotating the control member at a varying speed to thereby effect a constant-speed movement of the tool holder along the trochoidal path. The transmission may comprise coaxial rotary input and output elements, means for rotating the input element at a constant speed, and means for rotating the output element at a varying speed, in response to rotation of the input element at constant speed whereby the speed of the output element (and hence the speed of the control member which is driven by the output element) varies during each revolution of the output element to insure that the tool in the tool holder tracks the trochoidal path at a constant working speed.

The path along which the tool or tools move may be a true trochoidal path, an epitrochoidal or peritrochoidal, or a hypotrochoidal path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic plan view of an apparatus with a single tool holder which embodies one form of the invention;

FIG. 2 is an enlarged schematic sectional view of the apparatus of FIG. 1;

FIG. 3 is a similar detail sectional view of the apparatus shown in FIG. 1;

FIG. 8 is a schematic plan view of an apparatus with three tool holders which constitutes a modification of the apparatus shown in FIGS. 5 – 7;

FIG. 15 is a sectional view of a transmission constituting a modification of the transmission shown in FIG. 13.

DESCRIPTION OF THE PREFERRED EMBODIMENTS

Figure 4:
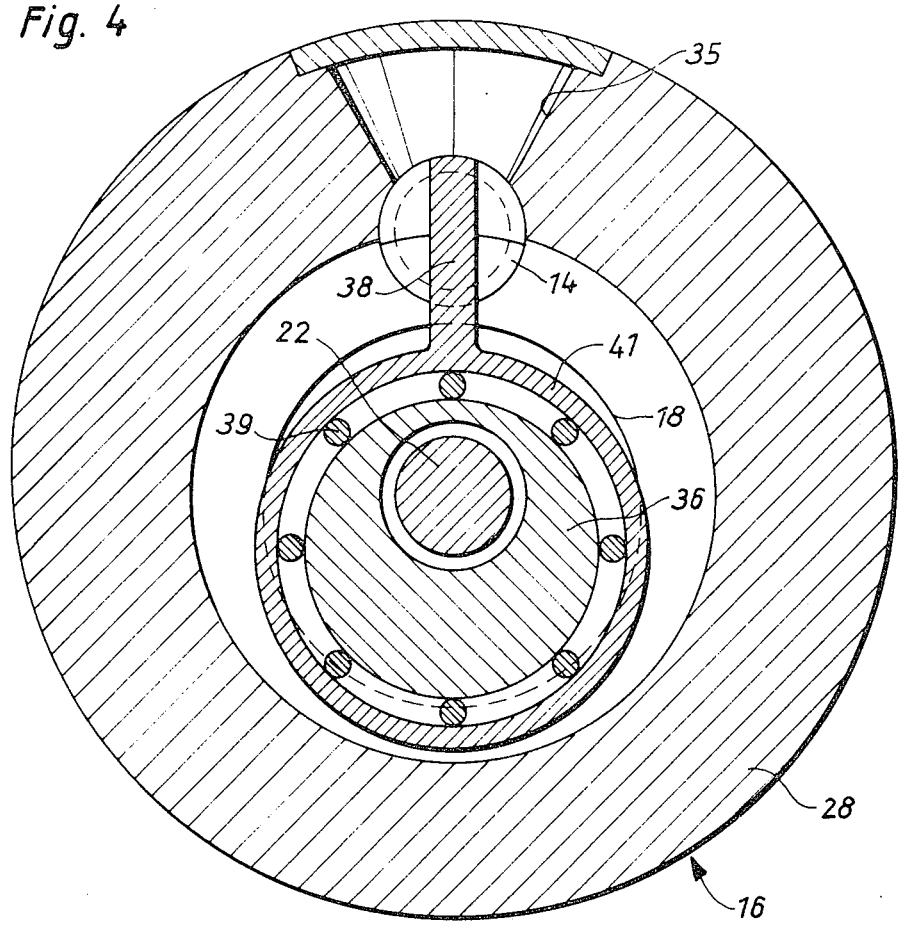
FIG. 4 is a sectional view as seen in the direction of arrows from the line 4—4 of FIG. 3.

FIGS. 1 and 2 illustrate schematically an apparatus which can be utilized to form the peripheral wall of the outer body or housing of a Wankel engine with a trochoidal internal surface (indicated by a heavy phantom line curve 12) which resembles a two-lobed epitrochoid. The surface represented by the curve 12 is machined by resorting to a single turning tool 13. The tool 13 is mounted in a tool holder 14 which is supported by a tool holder carrier 16. The latter is rotatable about the axis 18 of a control member 20 forming part of a drive means for the parts 13, 14 and 16. The control member 20 is rotatable on a fixedly mounted shaft 22 whose axis coincides with the axis of the area bounded by the curve 12, i.e., with the system axis. It will be noted that the axis 18 of the control member 20 is parallel to and spaced apart from the (system) axis of the fixed shaft 22. In the embodiment of FIGS. 1 and 2, the drive means for rotating the control member 20 comprises a pulley or sprocket wheel 24 forming part of a belt or chain transmission which receives motion from a suitable prime mover, not shown. When the control member 20 rotates about the common axis of the shaft 22 and pulley or sprocket wheel 24, its axis 18 travels along a circular path 26 (indicated in FIG. 1 by a phantom line) whose center is located on the system axis. This causes the carrier 16 to travel along an endless path whose center is not located on the axis of the fixed shaft 22.

The carrier 16 further performs a second movement which is superimposed upon the just described eccentric movement and involves rotation of the carrier about the axis 18 of the control member 20. As a result of such composite movement of the carrier 16, the holder 14 causes the tool 13 to describe the curve 12. In order to perform its second movement, the carrier 16 comprises a portion or member 28 which constitutes an internal gear having a circular internal surface provided with teeth 30 and rolling without slippage about a spur gear 32 rigidly secured to the front end of the fixed shaft 22. The circular peripheral surface of the gear 32 has teeth 31; at least on of the teeth 31 is in mesh with the adjacent tooth or teeth 30 of the internal gear 28 in all angular positions of the carrier 16 relative to the axis 18 of the control member 20. The ratio of the pitch circles of gears 28 and 32 determines the dimensions of the trochoidal curve 12. In the embodiment of FIGS. 1 and 2, the ratio is three-to-two. The surface which is provided with teeth 31 has its center on the system axis, and the surface which is provided with teeth 30 has its center on the axis 18.

Were the holder 14 rigidly mounted in the carrier 16, the setting and rake angles of the cutting edge of the tool 13 (with respect to a plane or line which is normal to the respective point of the curve 12) would vary continuously during movement of the carrier 16 with and relative to the control member 20. This would affect the quality of the material removing action and would cause deviations of the curve 12 from a desired trochoidal curve. Furthermore, such continuous changing of the setting and rake angles would reduce the useful life of the tool 13. Therefore, the apparatus of FIGS. 1 and 2 further comprises means for insuring that, during each stage of movement of the tool 13 along the path indicated by the curve 12, its cutting edge assumes a predetermined unchanged position with respect to a tangent at the cutting or material removing point. Such means includes a portion 15 of the tool holder 14 which is rotatable in the carrier 16 about an axis 17 parallel to the system axis and to the axis 18, and a device for changing the angular position of the holder 14 relative to the carrier 16 while the carrier 16 moves with and relative to the control member 20. The portion 15 of the holder 14 is formed with a diametrically extending guide channel 34 which is normal to the axis 17 and receives a portion of an elongated connecting or orienting rod 38. The control member 20 has a first eccentric portion or eccentric 36 whose axis is indicated at 37 (this axis coincides with the locus where the teeth 31 mate with the teeth 32). The eccentric portion 36 is surrounded by an antifriction roller bearing 39, which, in turn, is surrounded by a ring-shaped bearing member 41. When the internal gear 28 rolls around the fixed gear 32, the connecting rod 38 reciprocates in the guide channel 34 transversely of the axis 17 but permanently maintains the tool holder 14 and the tool 13 in the aforementioned orientation, i.e., in such angular position that the cutting edge of the tool 13 makes a predetermined constant angle with a tangent to the curve 12 at the point where the cutting edge removes material from the peripheral wall. Otherwise stated, the setting and rake angles of the cutting edge with respect to a line which is normal to the curve 12 at the material removing point remain unchanged in all positions of the internal gear 28 relative to the fixed gear 32. This insures that the outline of the internal surface of the peripheral wall of the body or housing of the Wankel engine is a true trochoidal curve.

A portion of the carrier 16 rotates on two antifriction ball bearins 19 surrounding the periphery of the control member 20. The connection rod 38 is normal to the system axis, i.e., to the axis of the shaft 22, and is located in a plane including the axes 17 and 37. The axis 37 passes through the point of slippage-free rolling contact between the gears 28 and 32. Such mounting of the connecting rod 38 insures that the axis 17 is always located on a line which is normal to the curve 12 at the point where the curve 12 is tracked by the cutting edge of the tool 13. The guide channel 34 insures that the tool holder 14 cannot turn relative to the connecting rod 38 (about the axis 17) but performs (with reference to the carrier 16) only such movements about the axis 17 which are induced by the connecting rod 38 as a result of rotation of the control member 20 about the axis of the shaft 22. The just described retention of tool holder 14 in a predetermined orientation insures that the tool 13 can machine a series of blanks with a high degree of accuracy and reproducibility. Moreover, the useful life of the tool is much longer than in conventional apparatus because the setting and rake angles of the cutting edge remain constant during each stage of each revolution of the carrier 16 and control member 20.

FIGS. 3 and 4 illustrate the details of the apparatus which is shown in FIGS. 1 and 2. The cutting edge of the tool 13 is indicated at 11 and the internal gear 28 of the carrier 16 has a recess 35 which registers with the guide channel 34 and flares radially outwardly (see FIG. 4) to receive the outermost portion of the connecting rod 38. The control member 20 can constitute a substantially cylindrical block which is freely rotatable on the fixed shaft 22 and can be made integral with the pulley or sprocket wheel 24 (not shown in FIGS. 3 and 4). The front end of the control member extends all the way or close to the gear 32 on the shaft 22. The main portion of the control member 20 constitutes a second eccentric portion whose axis is at 18 and which carries the aforementioned first eccentric portion 36 for the connecting rod 38. The ball bearings 19 surround the cylindrical peripheral surface of the main body portion or second eccentric portion of the control member 20 and are surrounded by the rearmost portion of the carrier 16. The first eccentric portion 36 is located forwardly of the second eccentric portion of the control member 20, as considered in the axial direction of the shaft 22. The gear 32 may be integral with the front end of the shaft 22. When the pulley or sprocket wheel 24 is driven, the axis 18 of the second eccentric portion of the control member 20 travels along the circle 26 to move the carrier 16 radially of the shaft 22 and the internal teeth 30 are in mesh with successive teeth 31 of the fixed gear 32 to cause the gear 28 to roll about the front end of the fixed shaft 22. In actual use, the entire apparatus can be moved in the axial direction of the shaft 22 so that the cutting edge 11 treats successive portions of the internal surface of the peripheral wall.

The system axis (of shaft 22) is located between the axes 18 and 37 in all angular positions of the carrier 16 and control member 20. Thus, the system axis is coplanar with the axes 18 and 37. Such arrangement contributes to simplicity and compactness of the apparatus.

The tool 13 is preferably adjustable with respect to the holder 14 so as to be movable to a plurality of different positions with respect to the connecting rod 38. For example, and referring to FIG. 3, the tool 13 can be moved lengthwise of the connecting rod 38 (as indicated by the double-headed arrow 2130 and can be fixed in a selected position by one or more screws, bolts or the like. Such adjustments compensate for wear on the cutting edge 11 and/or serve to change the dimensions of the finished surface. A portion of the tool 13 may extend into a groove which is machined into the holder 14 and extends in the direction indicated by arrow 213.

Figure 5:
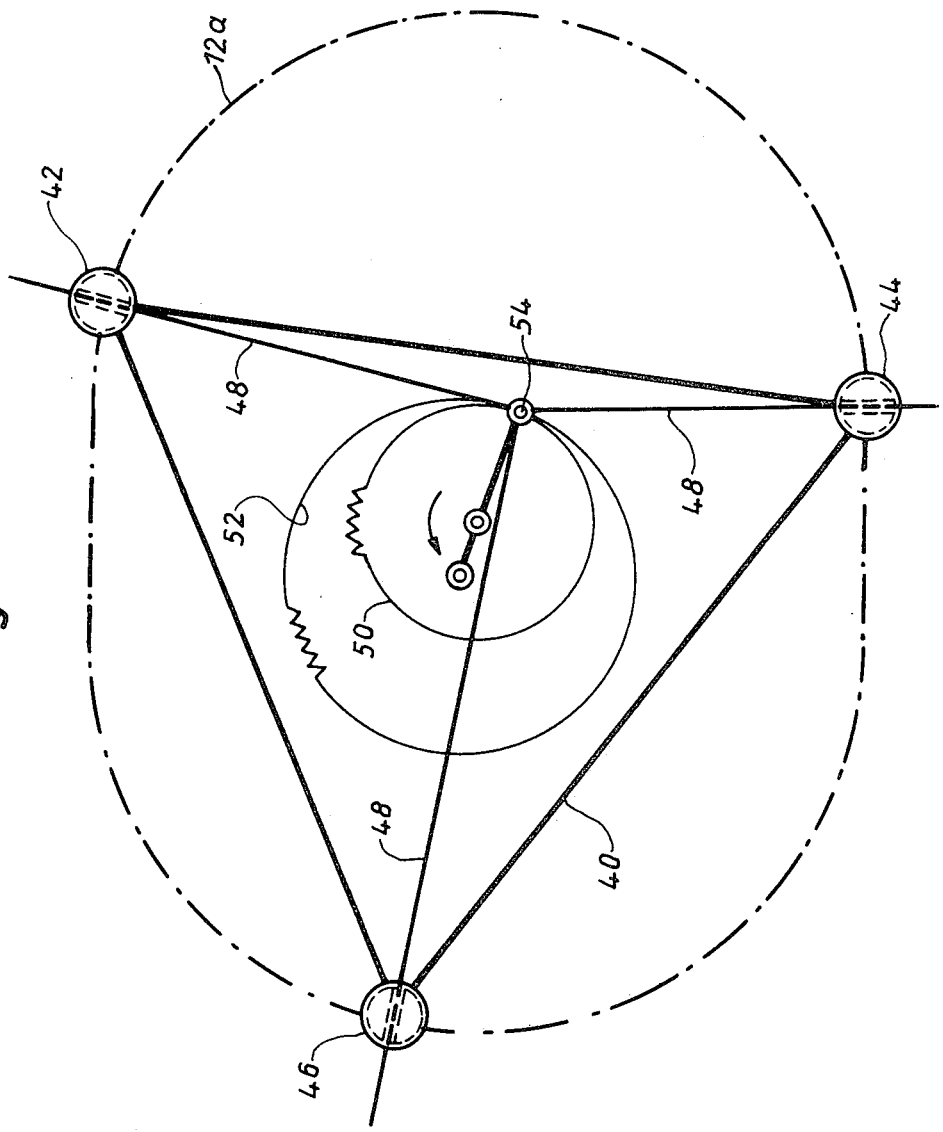
FIG. 5 is a schematic plan view of a second apparatus with three tool holders.
Figure 6:
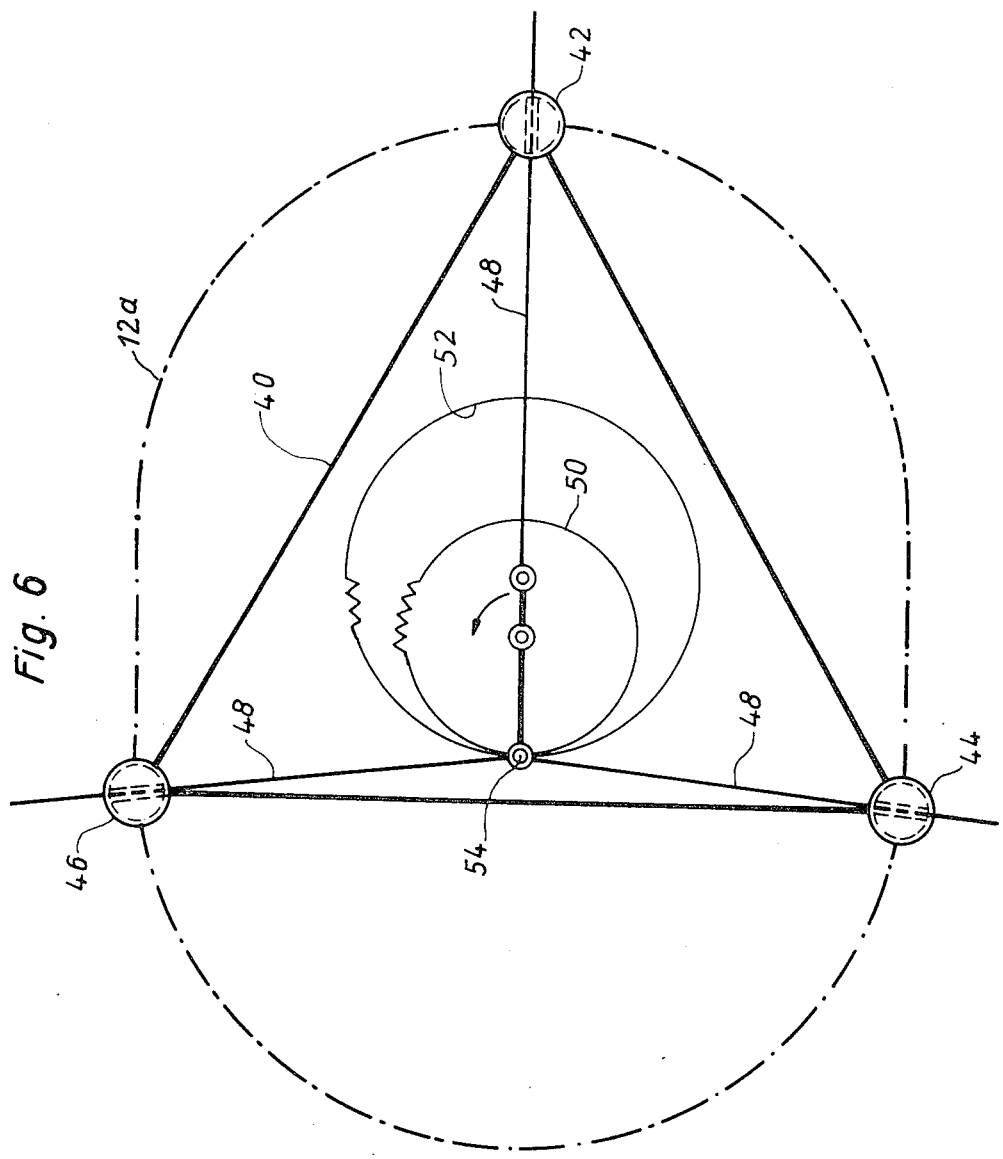
FIG. 6 illustrates the structure of FIG. 5 but with the carrier for the tool holders in a different angular position.
Figure 7:
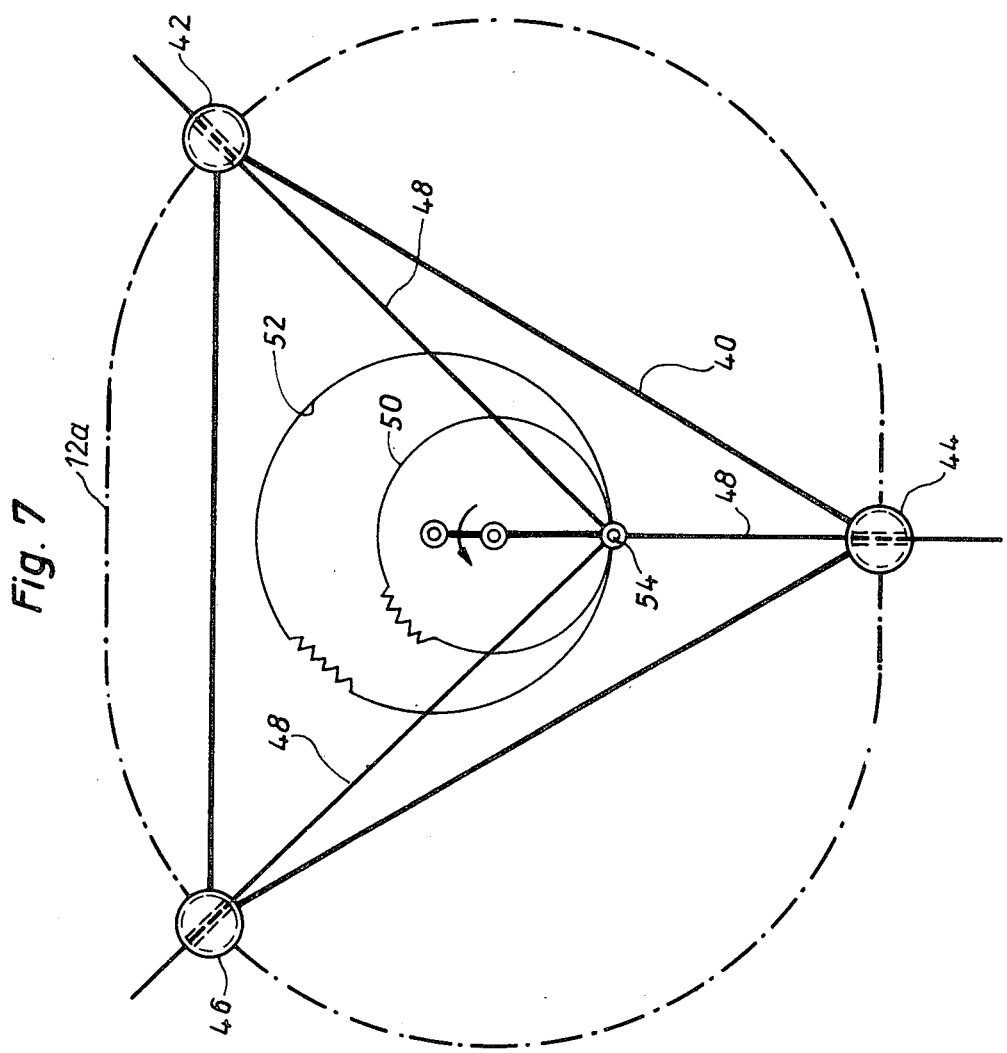
FIG. 7 illustrates the structure of FIG. 5 but with the carrier for tool holders in a further angular position.

FIGS. 5 to 7 show certain details of a second apparatus which comprises three tool holders 42, 44, 46 each of which supports a discrete material removing or other tool (not specifically shown). The tool holders 42, 44, 46 are disposed at the three apex portions of an imaginary inner body or rotor of a Wankel engine. The orientation of the tool holders is determined by three discrete orienting members or connecting rods 48 which are turnable independently of each other about the axis of the eccentric portion 54 of a control member, not shown. The eccentric portion 54 corresponds to eccentric portion 36 of the control member 20 shown in FIGS. 1 to 4. The carrier for the tool holders 42, 44, 46 is indicated at 40, the internal gear of the carrier 40 at 52, and the spur gear at the front end of the fixed shaft at 50. The axis of the eccentric portion 54 of the control member coincides with the point where the internal teeth of the gear 52 mate with the external teeth of the gear 50. Each of FIGS. 5, 6, and 7 shows a different stage of angular movement of the carrier 40 about the control member including the eccentric portion 54. It will be noted that the connecting rods 48 move axially in the guide channels of the respective tool holders 42, 44, 46 while the carrier moves about the control member. The trochoidal curve is shown at 12a.

FIG. 8 shows certain parts of a third apparatus wherein the carrier for three tool holders 42, 44, 46 comprises a spur gear 60 rolling about a spur gear 62 which is fixed to the shaft 67. The axis of the first eccentric portion 63 of the control member (the portion 63 corresponds to eccentric portion 36 of control member 20) is located between the axis 65 (corresponding to the axis 18) of the second eccentric portion of the control member and the system axis, i.e., the axis of the fixed shaft 67.

The tool holders 42, 44, 46 move the respective tools into material removing engagement with the peripheral wall of the body of the internal combustion engine during different stages of angular movement of the carrier with respect to the control member. The curve is shown at 12b.

The position of the system axis with respect to the axes of the eccentric portions of the control member depends upon whether the trochoidal path is to be tracked by a point located within or outside of a circle which rolls along the exterior or interior of a second circle (i.e., whether the path resembles a hypotrochoid resp. a peritrochoid or epitrochoid).

Figure 9:
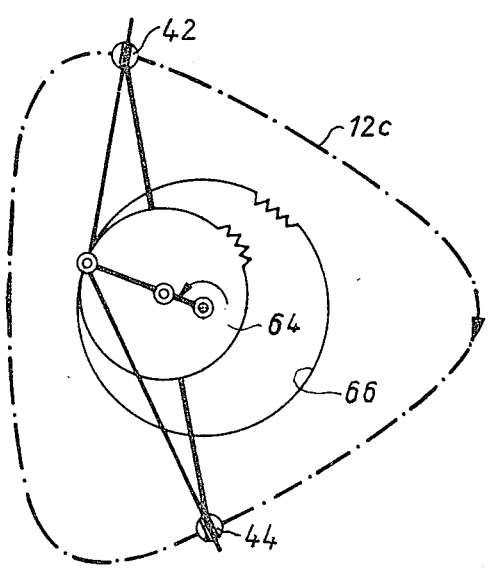
FIG. 9 is a schematic plan view of an apparatus which employs two tool holders.

In the apparatus of FIG. 9, the carrier for two tool holders 42, 44 is provided with a spur gear 64 which rolls in a fixed internal gear 66 corresponding to the gear 32 of FIGS. 1 to 4. The curve is shown at 12c.

Figure 10:
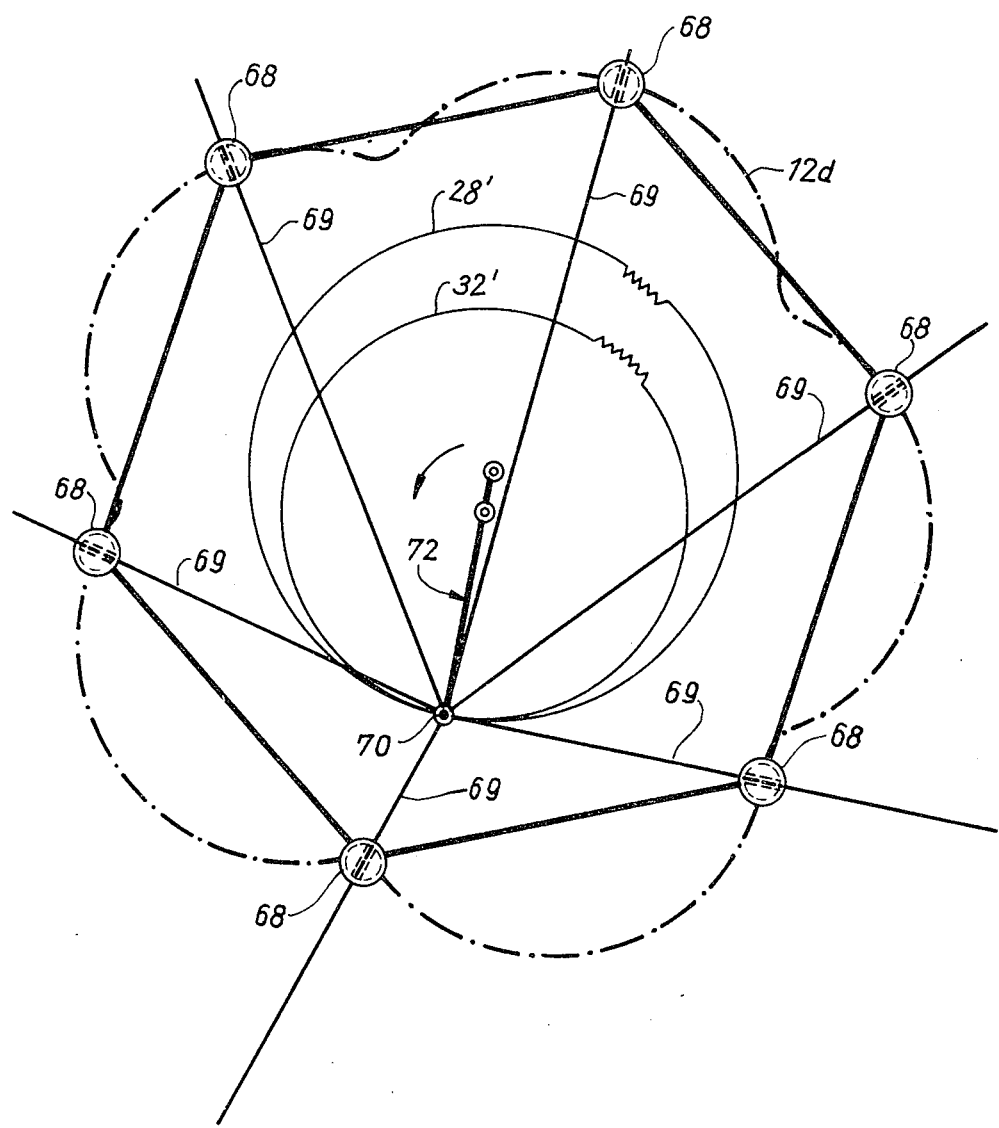
FIG. 10 is a schematic plan view of an apparatus with six tool holders.

The apparatus of FIG. 10 comprises six tool holders 68 whose orientation with respect to the curve 12d is determined by discrete connecting rods 69. All of the connecting rods 69 are turnable independently of each other about the axis of the first eccentric portion 70 of a control member 72. The internal gear of the carrier is shown at 28', and the fixed gear on the shaft of the apparatus is shown at 32'.

Figure 11:
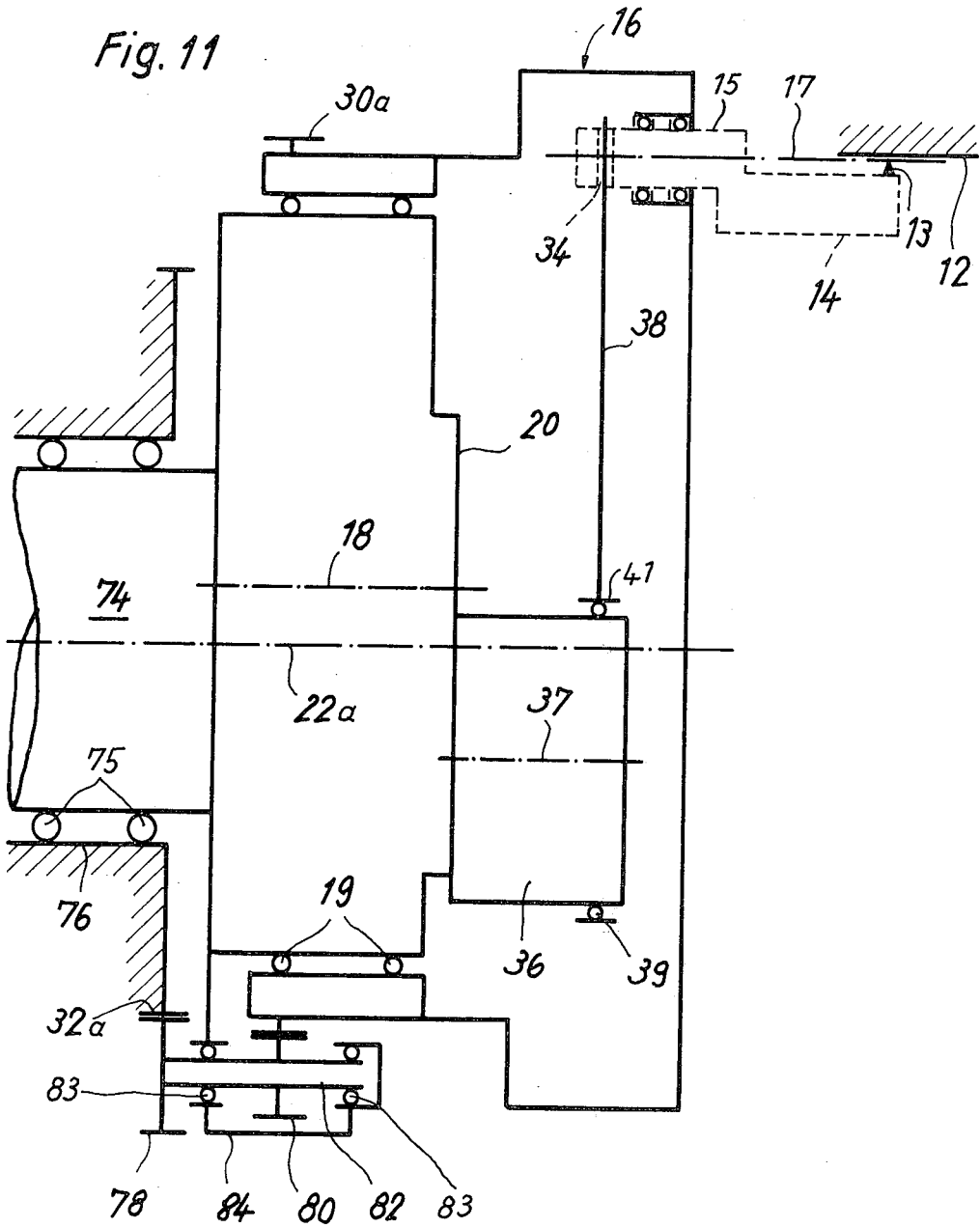
FIG. 11 is a schematic sectional view of a further apparatus constituting a modification of the apparatus shown in FIGS. 1 to 4.

FIG. 11 illustrates a further apparatus which is somewhat similar to but in certain respects simpler than the apparatus of FIGS. 1 to 4; therefore, all such parts of the apparatus of FIG. 11 which are identical with or clearly analogous to the corresponding parts of the first apparatus are denoted by similar reference characters. The main difference between the two apparatus is that the control member 20 is rigid with a rotary shaft 74 whose axis (corresponding to the system axis of the fixed shaft 22) is indicated at 22a. The shaft 74 rotates in antifriction bearings 75 which are installed in a fixed housing or casing 76 having a gear 32a coresponding to the gear 32. The carrier 16 has spur gear 30a which is axially spaced from and driven by the fixed gear 32a through the intermediary of a gear cluster including an intermediate shaft 82 parallel to the shaft 74, a first gear 78 fixed to the shaft 82 and meshing with the gear 32a, and a second gear 80 fixed to the shaft 82 and meshing with the gear 30a. The shaft 82 is rotatable in antifriction bearings 83 provided therefor in an enclosure 84 secured to the control member 20. The gear 78 acts not unlike a planet pinion of a planetary transmission and rolls around the fixed gear 32a while the shaft 74 drives the control member 20. The gear 80 then rotates the gear 30a and the carrier 16 about the axis 18 of the second eccentric portion of the control member 20.

If the apparatus of FIG. 11 comprises two or more tool holders 14, a discrete connecting rod 38 is provided for each tool holder, and each connecting rod 38 is reciprocable in the guide channel 34 of the rotatably mounted portion 15 of the respective tool holder 14. Each of the connecting rods 38 is preferably provided with a separate ring-shaped bearing member 41 which is rotatable independently of each other bearing member on one or more antifriction bearings 39 surrounding the peripheral surface of the first eccentric portion 36 of the control member 20.

Figure 12:
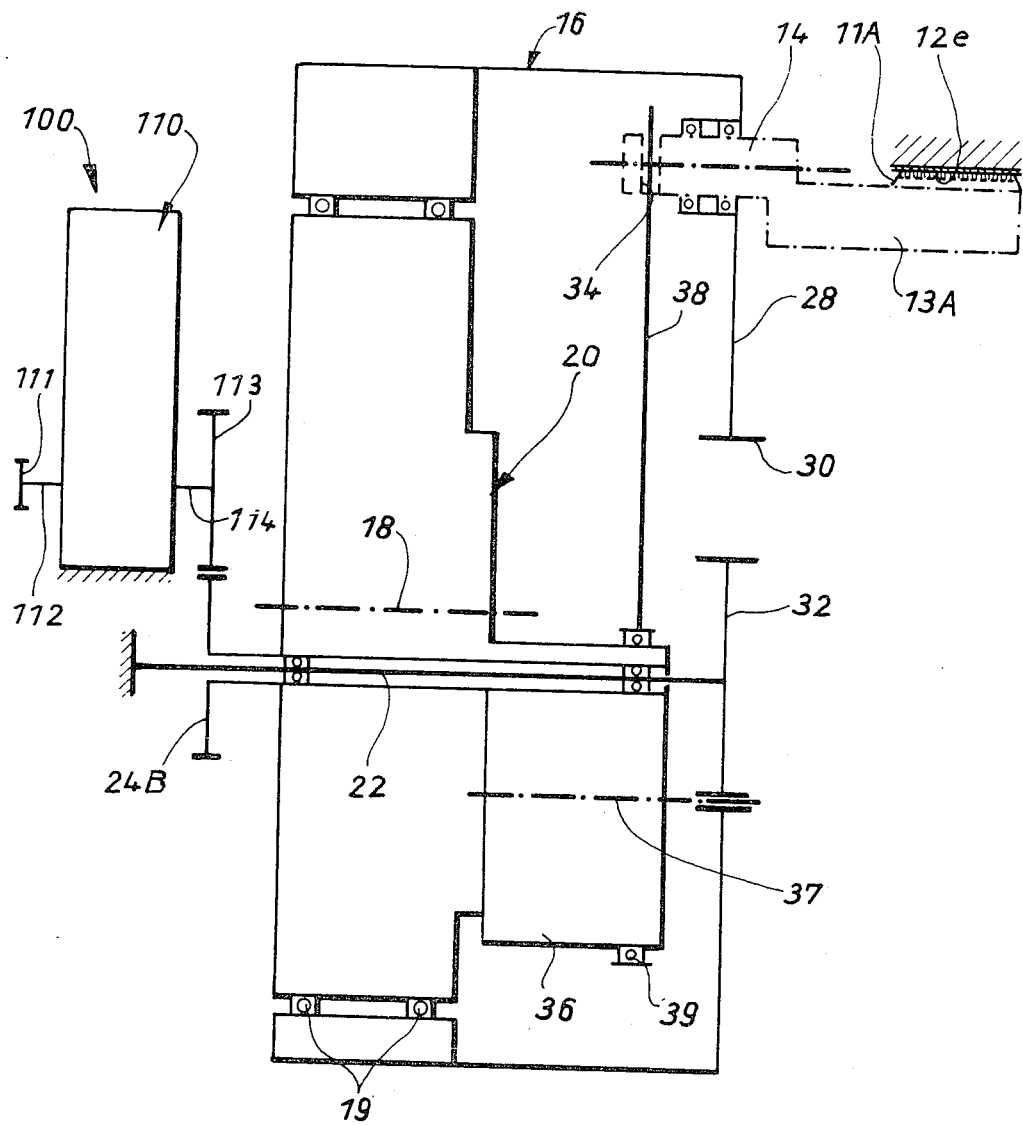
FIG. 12 is a schematic sectional view of still another apparatus constituting a further modification of the apparatus shown in FIGS. 1 to 4 and employing one or more holders for tools which apply material to a trochoidal surface.
Figure 13:
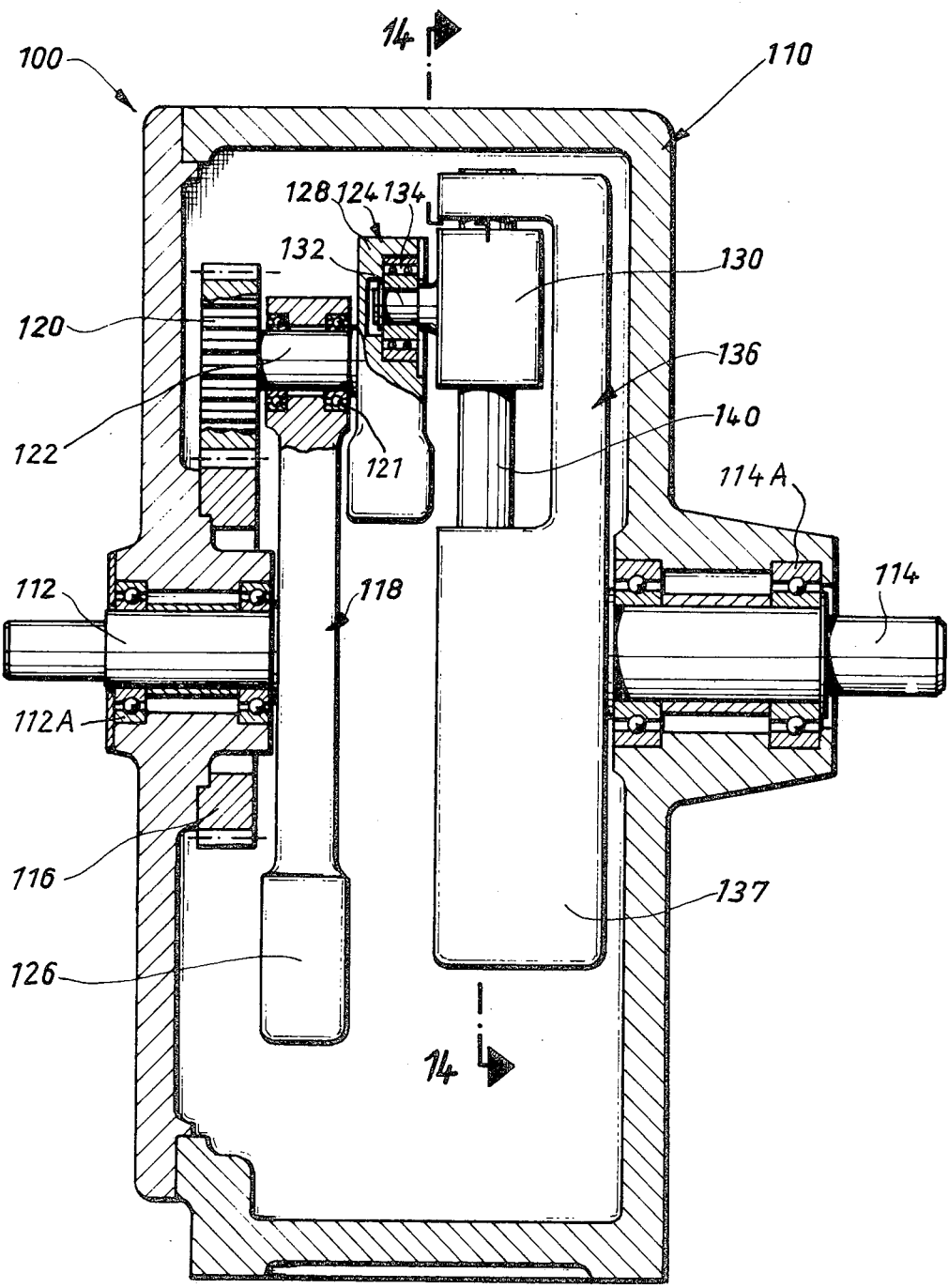
FIG. 13 is an enlarged sectional view of a transmission forming part of the apparatus shown in FIG. 12.
Figure 14:
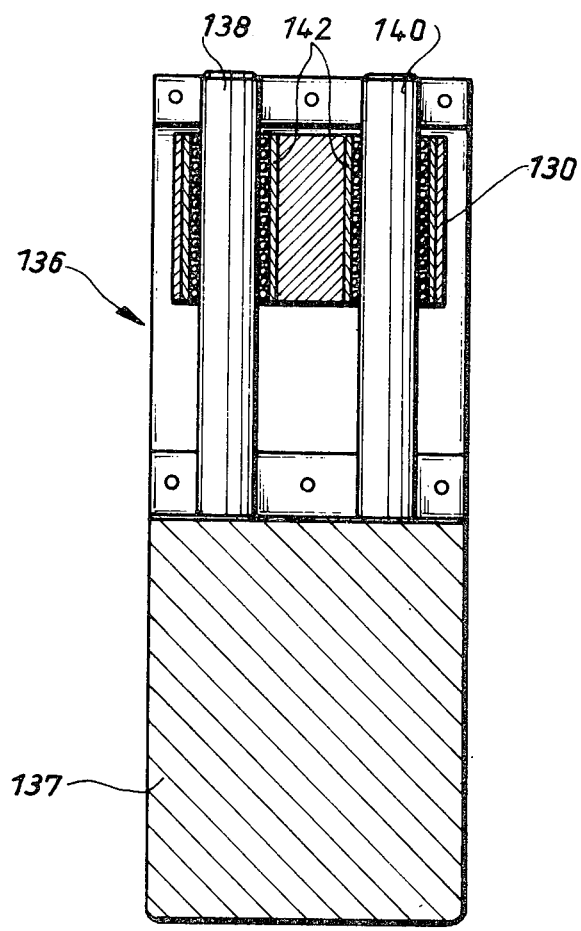
FIG. 14 is a sectional view as seen in the direction of arrows from the line 14 — 14 of FIG. 13.

The apparatus of FIG. 12 constitutes a further modification of the apparatus shown in FIGS. 1–4, and the details of certain of its parts are shown in FIGS. 13 and 14. The curve 12e denotes the outline of a trochoidal internal surface which is to be treated by a single tool 13A having a nozzle 11A with one or more orifices (not specifically shown) which serve to deposit a layer of a suitable alloy on the internal surface. Thus, the tool 13A can be used to treat a surface which has been machined by resorting to the tool 13 of FIGS. 1 to 4. All such parts of the apparatus shown in FIGS. 12–14 which are identical with or clearly analogous to the corresponding parts of the apparatus of FIGS. 1 to 4 are denoted by similar reference characters.

The main difference between the apparatus of FIGS. 1 – 4 and 12 – 14 is that the latter apparatus comprises a special transmission 100 having a rotary input element 112 (e.g., a stub shaft) which is driven at a constant speed by a gear 111 receiving torque from a prime mover (not shown), and rotary output element 114 (e.g., a second stub shaft) having a gear 113 which meshes with and drives a gear 24B on the control member 20. The gear 24B is a functional equivalent of the pulley or sprocket wheel 24. The connecting rod 38 insures that the orientation of the nozzle 11A with respect to the tangent or a line which is normal to the point where the nozzle discharges metallic material remains unchanged while the carrier 16 rotates about the control member 20 and the control member 20 rotates with the gear 24B. The apparatus of FIGS. 12 to 14 thereby insures that the entire internal surface of the peripheral wall of the housing or outer body of a Wankel engine or the like is coated with a uniform layer of metallic material. The transmission 100 insures that the speed of movement of the tool 13A along the internal surface remains constant.

The details of the transmission 100 are shown in FIGS. 13 and 14. This transmission comprises a case 110 having coaxial antifriction bearings 112A and 114A for the input element 112 and output element 114. The bottom wall of the case 110, as viewed in FIG. 13, is secured to a fixed base, not shown, and the elements 112, 114 are respectively journalled in the left-hand and right-hand end walls of the case 110. The inner side of the left-hand end wall of the case 110 supports fixedly mounted gear 116 which meshes with a smaller gear 120 fixedly secured to a shaft 122 mounted in one arm of a two-armed support 118. The other arm 126 of the support 118 constitutes a counterweight which insures a smooth rotary movement of the support with the input element 112. The median portion of the support 118 is fixed to the input element 112. The axis of the shaft 122 is parallel to the axis of the input element 112. The shaft 122 rotates in antifriction bearings 121 provided therefore in the respective arm of the support 118.

The right-hand end of the shaft 122, as viewed in FIG. 13, is rigid with a motion transmitting member 124 which comprises a receptacle 128 for antifriction ball bearings 134 surrounding the stub 132 of a slide-like follower 130 movable along two tie rods 138, 140 provided in a guide member 136 which is rigid with the output element 114. The tie rods 138, 140 are parallel to each other (see FIG. 14), and the follower 130 has ball bearings 142 which surround the two tie rods.

These tie rods extend radially of the output element 114. The guide member 136 has an extension 137 which constitutes a counterweight and insures a smooth angular movement of the output element 114.

In the transmission 100 of FIGS. 12 – 14, the ratio of the radii of pitch circles of the gears 116, 120 is two-to-one. Furthermore, the axis of the stub 132 is parallel with but eccentric to the axis of the shaft 122; however, the axis of the stub 132 is located within the pitch circle of the gear 120. Due to rolling movement of the gear 120 about the fixed gear 116, and due to eccentricity of the axis of stub 132 with respect to the axis of the shaft 122, a point on the axis of the stub 132 travels along an epitrochoidal path whenever the input element 112 drives the support 118. The exact size of the epitrochoid can be determined in advance by appropriate selection of the aforementioned ratio of the radii of pitch circles of gears 116, 120 and the eccentricity of the stub 132 with respect to the shaft 122. The system axis (of shaft 22) is parallel to the axis of the input element 112. While the motion transmitting member 124 orbits about axis of the input element 112, it also rotates about the axis of the shaft 122 whereby the follower 130 (which drives the output element 114 via guide member 136) moves radially of the output element 114 by sliding along the tie rods 138, 140. Thus, the follower 130 also travels along a predetermined epitrochoidal path. This is due to the following: The motion transmitting member 124 travels at a constant speed along a circular path (about the axis of the input element 112). Secondly, the stub 132 travels along a circular path about the axis of the shaft 122. These two movements are superimposed upon each other and insure that the output element 114 is accelerated and decelerated during predetermined stages of each of its revolutions.

The changes in angular speed of the output element 114 during each of its revolutions are utilized to influence the drive means for the carrier 16, tool holder 14 and tool 13A in such a way that the working speed of the tool 13A remains unchanged in spite of the fact that the distance between the system axis (axis of the shaft 22) and the nozzle 11A of the tool 13A varies as the nozzle 11A travels along the internal surface 12e. The arrangement is such that the angular speed of the control member 20 decreases while the distance between the tool 13A and the system axis increases, i.e., when the working speed of the tool tends to increase, and vice versa. Such regulation or uniformization of the working speed insures that the material issuing from the orifice or orifices of the nozzle 11A provides the surface 12e with a coat of constant thickness.

FIG. 15 illustrates a transmission 100′ which constitutes a modification of the transmission 100 of FIGS. 13 and 14. The support 150 of FIG. 15 is provided or connected with an internal gear 152 which meshes with a gear 116′ fixed to the left-hand end wall of the case 110′. An eccentric portion 154 of the input element 112′ is surrounded by antifriction ball bearings 151 for the support 150. The system axis, i.e., the axis of the curve which is tracked by the tool (not shown) is parallel to the axis of the input element 112′. The stub 132′ of the follower 130′ is rotatable in antifriction bearings 156 provided therefor in the receptacle of a motion-transmitting member 124′. The receptacle is mounted in the support 150 radially outwardly of the eccentric portion 154. The tool which is driven by the output element 114′ travels along a trochoidal path. The ratio of the pitch circles of the gears 152, 116′ is three-to-two. When the input element 112′ is driven by a prime mover, not shown, the eccentric portion 154 causes the support 150 to rotate due to engagement of gears 152, 116′, whereby the follower 130′ moves along the tie rods (only the tie rod 140′ shown) of the guide member 136′ on the output element 114′. The reference characters 137′, 142′ respectively denote the counterweight of the guide member 136′ and the antifriction ball bearings in the follower 130′.

The transmission 100′ exhibits the advantages of the transmission 100.

The case 110 or 110′ can be omitted if the parts of the transmission 100 or 100′ are mounted directly in the housing or casing of the apparatus including the control member, carrier and one or more tool holders.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptation should and are intended to be comprehended within the meaning and range of equivalence of the claims.

What is claimed as new and desired to be protected by letters Patent is set forth in the appended claims:

1. In an apparatus for moving at least one tool along a trochoidal path having a system axis, a combination comprising a control member; a carrier rotatable relative to said control member about a second axis parallel to said system axis; drive means for rotating said control member about said system axis and for thereby orbiting said second axis along a circular path having its center on said system axis; at least one tool holder mounted in said carrier for angular movement about a third axis parallel to said system axis; means for rotating said carrier relative to said control member about said second axis during rotation of said control member about said system axis; and means for changing the angular position of said holder relative to said carrier in response to rotation of said control member, including an eccentric on said control member, a rigid orienting member turnably supported by said eccentric and movable transversely of said third axis, and guide means for preventing angular movements of said holder relative to said orienting member, said guide means comprising a channel provided in said holder and reciprocably receiving said orienting member.

2. A combination as defined in claim 1, wherein said means for rotating said carrier relative to said control member about said axis comprises a stationary first member having a first circular surface and an axis coinciding with said system axis, and a second member rigid with said carrier and having a second circular surface arranged to roll without slippage along said first circular surface in response to rotation of said control member, said second member having an axis coinciding with said second axis.

3. A combination as defined in claim 1, wherein said carrier has a recess in register with said channel to receive a portion of said rigid orienting member in at least one angular position of said eccentric with respect to said system axis.

4. A combination as defined in claim 1, wherein said orienting member is a connecting rod which moves in said channel only lengthwise in response to rotation of said control member.

5. A combination as defined in claim 1, further comprising a fixed shaft having an axis coinciding with said system axis, said control member being rotatably mounted on said shaft and said means for rotating said carrier relative to said control member about said second axis comprising a first member coaxial and rigid with said shaft and having a first circular surface and a second member rigid with said carrier and having a second circular surface arranged to roll without slippage directly along said first surface in response to rotation of said control member, said eccentric having an axis which coincides with the point of rolling contact between said first and second surfaces.

6. A combination as defined in claim 1, wherein said control member comprises a second eccentric having an axis coinciding with said second axis and said carrier includes a portion which surrounds and is rotatable on said second eccentric.

7. A combination as defined in claim 6, further comprising a fixed shaft having an axis coinciding with said system axis, said second eccentric being rotatable on said shaft.

8. A combination as defined in claim 6, wherein said eccentrics are offset relative to each other, as considered in the direction of said system axis.

9. A combination as defined in claim 1, wherein said means for rotating said carrier about said second axis comprises a fixed first member having an axis coinciding with said system axis and a first circular surface, and a second member rigid with said carrier and having an axis coinciding with said second axis, said second member surrounding said first member and said second surface being arranged to roll along said first surface in response to rotation of said control member.

10. A combination as defined in claim 9, wherein said eccentric has a fourth axis parallel to said system axis, said system axis being disposed between said second and fourth axes in all angular positions of said control member and said carrier.

11. A combination as defined in claim 1, wherein said eccentric has a fourth axis which is parallel to said system axis and is located between said system axis and said second axis in all angular positions of said carrier and said control member.

12. A combination as defined in claim 11, wherein said means for rotating said carrier about said second axis comprises a fixedly mounted first member having an axis coinciding with said system axis and a first circular peripheral surface, and a second member rigid with said carrier and having an axis coinciding with said second axis, said second member having a second circular peripheral surface arranged to roll without slippage about said first peripheral surface in response to rotation of said control member, said fourth axis passing through the point of rolling contact between said peripheral surfaces.

13. A combination as defined in claim 1, wherein said means for rotating said carrier about said second axis comprises a fixed first gear having an axis coinciding with said system axis and a second gear rigid with said carrier and having an axis coinciding with said second axis, said second gear meshing with and being arranged to roll along said first gear in response to rotation of said control member.

14. A combination as defined in claim 1, further comprising means for adjustably mounting a tool on said holder so that the tool can be secured to said holder in a plurality of different positions with respect to said rigid orienting member.

15. A combination as defined in claim 1, comprising a plurality of tool holders each mounted in said carrier for angular movement about a discrete third axis and a plurality of rigid orienting members, one for each of said holders, each of said orienting members being turnably mounted on said eccentric and each thereof being movable substantially transversely of the respective third axis, each of said holders having a discrete channel for the respective orienting member.

16. A combination as defined in claim 15 wherein said eccentric has a fourth axis parallel to said system axis and each of said orienting members comprises a ring-shaped portion surrounding said eccentric and being freely rotatably thereon, said portions of said orienting members being rotatable independently of each other and being disposed one behind the other, as considered in the direction of said fourth axis.

17. A combination as defined in claim 16, wherein said holders are spaced apart from each other, as considered in the direction of rotation of said carrier about said second axis.

18. A combination as defined in claim 1, wherein the speed of movement of said holder along said trochoidal path varies at a constant speed of said control member and said drive means comprises means for rotating said control member at a varying speed to thereby effect a constant-speed movement of said holder along said trochoidal path.

19. A combination as defined in claim 18, wherein said means for rotating said control member at said varying speed comprises a transmission having a rotary input element, means for rotating said input element at a constant speed, a rotary output element arranged to drive said control member, and means for rotating said output element at said varying speed in response to rotation of said input element at said constant speed.

20. A combination as defined in claim 19, wherein said means for rotating said output element comprises a fixed first member having a circular surface and being coaxial with said input element, a second member arranged to roll without slippage along said circular surface in response to rotation of said input element and having a fourth axis parallel to said system axis, and means for rotating said output element at said varying speed in response to rolling of said second member along said circular surface, said means for rotating said output element at said varying speed in response to rolling of said second member comprising a follower movable radially of said output element in response to rolling of said second member along said circular surface and a guide member rigid with said output element and movably coupled to said follower.

21. A combination as defined in claim 20, wherein said input element extends through said first member and said transmission further comprises a support driven by said input element and mounting said second member and said follower.

22. A combination as defined in claim 21, wherein said support is rigid with said input element and said circular surface is the peripheral surface of said first member, said second member being rotatable in said support and said transmission further comprising motion transmitting means rigid with said second member and rotatably mounting said follower.

23. A combination as defined in claim 21, wherein said input element comprises an eccentric portion and said support is rotatable on said eccentric portion, said circular surface constituting the peripheral surface of said first member and said second member having a circular internal surface which rolls along said peripheral surface in response to rotation of said input element.

24. A combination as defined in claim 20, wherein said first and second members are mating gears.

25. A combination as defined in claim 20, wherein said guide member comprises at least one tie rod extending substantially radially of said output element and said follower is reciprocable along said tie rod.

26. A combination as defined in claim 25, further comprising friction reducing means interposed between said follower and said tie rod.

27. A combination as defined in claim 20, wherein said guide member comprises a counterweight.

28. a combination as defined in claim 20, wherein said transmission further comprises a support for said second member and said follower, said support being driven by said input element and comprising a counterweight.

29. A combination as defined in claim 19, wherein said transmission further comprises a case for said elements and said means for rotating said output element.

30. A combination as defined in claim 19, wherein the axis of said input element coincides with the axis of said output element and is parallel to said system axis.

31. In an apparatus for moving at least one tool along a trochoidal path having a system axis, a combination comprising a control member; a carrier rotatable relative to said control member about a second axis parallel to said system axis; drive means for rotating said control member about said system axis and for thereby orbiting said second axis along a circular path having its center on said system axis, said drive means comprising a shaft rigid with said control member and having an axis coinciding with said system axis; at least one tool holder mounted in said carrier for angular movement about a third axis parallel to said system axis; means for rotating said carrier relative to said control member about said second axis during rotation of said control member about said system axis, comprising a fixed casing surrounding said shaft and having a first gear, a second gear provided on said carrier and having an axis coinciding with said second axis, a second shaft rotatably supported by said control member, a third gear provided on said second shaft and meshing with said first gear, and a fourth gear provided on said second shaft and meshing with said second gear; and means for changing the angular position of said holder relative to said carrier in response to rotation of said control member, including an eccentric on said control member, an orienting member turnably supported by said eccentric and movable transversely of said third axis, and guide means for preventing angular movements of said holder relative to said orienting member.

32. A combination as defined in claim 31, wherein said second gear is offset with respect to said first gear, as considered in the direction of said system axis, said second shaft being parallel to said first mentioned shaft.

* * * * *